E. C. JONES.
STEERING APPARATUS FOR STEAM CARRIAGES.

No. 17,970. Patented Aug. 11, 1857.

UNITED STATES PATENT OFFICE.

EDWARD C. JONES, OF PITTSBURGH, PENNSYLVANIA.

STEERING APPARATUS OF STEAM-CARRIAGES.

Specification of Letters Patent No. 17,970, dated August 11, 1857.

*To all whom it may concern:*

Be it known that I, EDWARD C. JONES, of Pittsburgh, in the county of Allegheny and State of Pennsylvania, have invented a new and useful Improvement in Steering Apparatus for Steam-Carriages; and I hereby declare that the following is a full, clear, and exact description of the construction and operation of the same, reference being had to the annexed drawings, making a part of this specification.

The nature of my improvement consists in arranging the steering apparatus of a three wheeled steam carriage in such a manner, that the same parts, by which the steering wheel is operated, communicate with, and act by a lever arrangement on clutches, set on the driving wheel shaft, and gripping into the hubs of the driving wheels;—the action being such, that, when the steering wheel is turned either to the left or to the right; the clutch either on the left or the right driving wheel is thrown out of connection with its wheel, whereby only one of the driving wheels acts propelling, causing the carriage to readily turn, either to the left or right, as the case may be; and my improvement further consists in the peculiar lever arrangement (which will hereafter be described) by which the parts, operating the steering wheel, communicate with, and act on the aforesaid clutches; and further in the mode, of turning the steering wheel with its axle to the right or left, on a pivot which passes through the axle, near or in the center of the steering wheel.

To enable others skilled in the art to make and use my invention; I will proceed to describe the accompanying drawings, in which—

Figure 1:
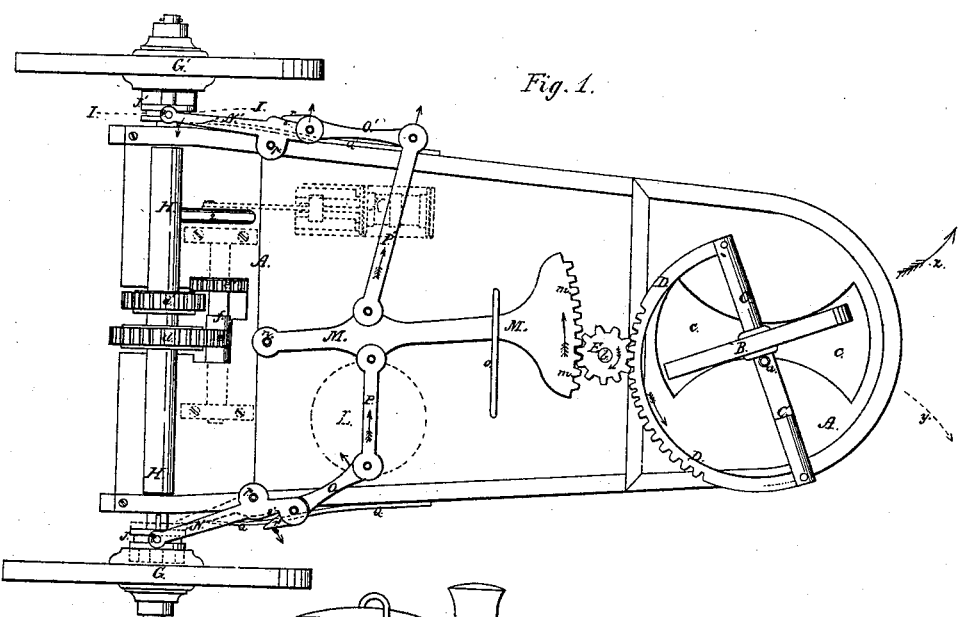
Figure 2:
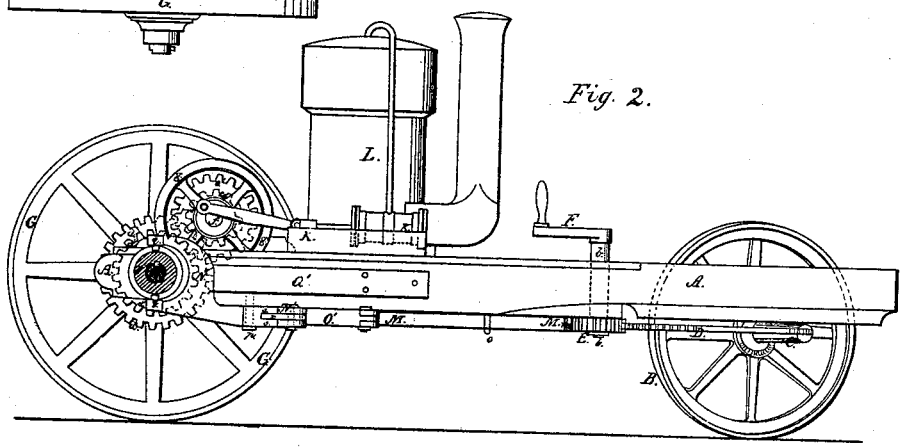

Figure 1 is an underside view of the steam carriage and Fig. 2 a side view of the same, one of the driving wheels being cut away, the section being taken through one of the clutches, as indicated by the line I—II in Fig. 1.

In these figures the same letters of reference indicate alike parts.

A A is the carriage frame; B the steering wheel set loose on its axle C.

*a* is a pin through the axle, forming the fulcrum on which the axle turns or vibrates.

D is a toothed segment fastened to the axle C; E a pinion set on the shaft *b*, which passes through the carriage frame, and is provided at its upper end with a crank F.

By turning the crank F, the pinion E, gearing into the segment D, will cause the axle C of the steering wheel, to turn on its fulcrum *d*, whereby the steering wheel can be brought into any desired position, for the purpose of steering to the right or to the left. There is an opening *c*, *c*, cut out of the frame A, of a sufficient size, to allow the steering wheel its required play.

G, G', are the driving wheels set loose on the main driving shaft H.

J, J' are clutches gripping into the hubs of the driving wheels. The clutches are movable, and slide on the shaft with tongue and groove, so that they can be thrown in or out of connection with their respective driving wheels.

M is lever, with a teethed segment *m*, gearing into the pinion E; the lever has its fulcrum in *n* and is guided by a transverse rod *o*.

N, N' are forked levers, which have their fulcras in *p*, *p*. The pins *q* of their forked arms enter into the grooves of the clutches in the ordinary manner. There is an arm O O', connected with each of the levers N, N', by a butt hinge joint, the purpose of which will be described hereafter.

P, P', are links, connecting the lever M with the arms O, O'.

Q Q' are springs fastened on the sides of the carriage frame, and operating on the forked arm of the lever N.

The operation of the described lever arrangement is as follows: If the pinion E is turned in the direction as indicated by arrow, the lever M will move as shown by arrow, when the link P' will push against the arm O', and the extension *p* of the same butting against the lever N', at *s*, will cause the lever N' to move as indicated by arrows, whereby the clutch J' is moved back out of connection with the wheel G'. On the other side, by the motion of the lever M the link P will be pulled as indicated by arrow, whereby the arm O is turned as shown. The motion of the arm in this direction has no effect on the lever N, as the butting surfaces *r'* and *s'* of the hinge joint do not come into but out of contact. The clutch J will therefore remain undisturbed. Thus in the position of the steering wheel B, as shown in Fig. 1; the driving wheel G' is unshipped, and the power of the driving wheel shaft is communicated to the wheel G only. This will naturally cause the carriage to turn readily in the direction as indicated by the arrow $z$. If the pinion E is turned in the opposite direction, the position of the steering wheel will change to the other side and the motion of the described lever arrangement will be reversed so as to throw the clutch J out of connection and leaving the J' in connection with the driving wheel. This will cause the carriage to turn in a direction, as indicated by the dotted arrow $y$, which is to the opposite side of the above motion of the carriage.

When the steering wheel is in its central position (viz., neither be turned to the right nor to the left side), the lever M will also be central, and it is obvious, that in this case none of the clutches will be thrown out of connection with its respecive driving wheel. Both driving wheels receiving therefore motion from their shaft H, the carriage will be propelled straight forward.

The purpose of the springs Q Q' is to force the clutches into connection with their respective driving wheels again (after they had been thrown out, by the action of the levers) as soon as they are released by a reverse motion of the levers.

The driving wheel shaft H communicates with the steam engine by cog wheels $d$, $d'$, gearing into the wheels $e$, $e'$, on the engine shaft $f$.

K, K, is the engine, and L the boiler; the position or location of the boiler and engine are indicated by dotted lines in Fig. 1.

Z is a fly wheel set on the engine shaft. The double set of wheel gearing $d$, $d'$, and $e$, $e'$, is for the purpose of changing the speed of the carriage, and they are proportioned in relation to each other, to suit any speed, that may be desired; the Fig. 1, shows the wheels $d$ and $e$ in gear and $d'$ and $e'$ out of gear. To change the speed of the carriage, the wheel $e$ is to be unshipped from the wheel $d$ and the wheel $e'$ set into gear with $d'$.

The ordinary manner of supporting and turning the steering wheel, is the application of a whole (or partial) circular ring, around it, which receives the ends or journals of the wheel axle, and has to be properly guided and kept in true position. In my arrangement the shaft C' of the steering wheel simply turns on a pivot in or near the center of the steering wheel, as mentioned above. This is a more simple manner, and causes less friction.

I am aware that the lever arrangement, which communicates the motion from the parts, operating the steering wheel, to the clutches of the driving wheels may be modified and changed in many different ways and by various mechanical means, I therefore do not confine myself to any particular or to the special lever arrangement, herein described, to effect said communication of motion or power, but—

What I claim, and desire to secure by Letters Patent is:

1. Operating the clutches J, J', of the driving wheels, by the same parts, by which the steering wheel is operated, in such a manner, as to disengage (by operating the said clutches) the one or the other of the driving wheels, simultaneously with the turning of the steering wheel, to the right or left, substantially as herein set forth.

2. I claim the arrangement of the lever M, links P, P', levers N, N' with their arms O, O', connected therewith by a butt hinge-joint, and the springs Q, Q', when constructed, combined, and operating in connection with the pinion E and the clutches J, J', substantially as described, and for the purpose set forth.

3. I claim, the arrangement of a pivot in or near the center of the steering wheel and passing through its axle, for the purpose herein set forth.

E. C. JONES.

Witnesses:
   And. McMaster,
   Wm. Scheib.